United States Patent
Taki et al.

(10) Patent No.: US 10,099,688 B2
(45) Date of Patent: Oct. 16, 2018

(54) VEHICLE CONTROL METHOD AND VEHICLE CONTROL SYSTEM

(71) Applicant: TOYOTA JIDOSHA KABUSHIKI KAISHA, Toyota-shi (JP)

(72) Inventors: Naoki Taki, Okazaki (JP); Masaaki Uechi, Nagoya (JP); Yoji Mizoguchi, Nagakute (JP); Hiroshi Harada, Nagakute (JP); Kumiko Kondo, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 84 days.

(21) Appl. No.: 14/908,478

(22) PCT Filed: Jul. 11, 2014

(86) PCT No.: PCT/IB2014/001307
§ 371 (c)(1),
(2) Date: Jan. 28, 2016

(87) PCT Pub. No.: WO2015/015259
PCT Pub. Date: Feb. 5, 2015

(65) Prior Publication Data
US 2016/0194000 A1    Jul. 7, 2016

(30) Foreign Application Priority Data

Jul. 30, 2013  (JP) ................................. 2013-158133

(51) Int. Cl.
*G06F 7/70*        (2006.01)
*B60W 30/09*    (2012.01)
(Continued)

(52) U.S. Cl.
CPC ............... *B60W 30/09* (2013.01); *B60T 7/22* (2013.01); *B60W 10/06* (2013.01); *B60W 10/18* (2013.01);
(Continued)

(58) Field of Classification Search
CPC .... B60T 7/22; B60T 2201/022; B60W 30/08; B60W 30/09; B60W 2710/182;
(Continued)

(56) References Cited

U.S. PATENT DOCUMENTS 5,601,347 A * 2/1997 Fischle .................... B60T 8/173
303/139
2001/0027372 A1  10/2001 Hellmann et al.
(Continued)

FOREIGN PATENT DOCUMENTS

DE    10 2004 055399 A1    5/2006
DE    10 2004 062496 A1    7/2006
(Continued)

OTHER PUBLICATIONS

International Search Report dated Nov. 28, 2014, in PCT/IB2014/001307 Filed Jul. 11, 2014.

*Primary Examiner* — Hussein Elchanti
(74) *Attorney, Agent, or Firm* — Oblon, McClelland, Maier & Neustadt, L.L.P.

(57) ABSTRACT

A vehicle control method of performing automatic braking for automatically braking a vehicle or alarm output, depending on a possibility of a collision between the vehicle and an obstacle, includes: cancelling the automatic braking or the alarm output, when an accelerator operation amount is equal to or larger than a predetermined threshold value, during the automatic braking or the alarm output, and cancelling the automatic braking or the alarm output, when a given cancellation condition is satisfied under a situation where the (Continued)

accelerator operation amount of the vehicle is smaller than the predetermined threshold value, during the automatic braking or the alarm output.

11 Claims, 3 Drawing Sheets

(51) Int. Cl.
| | |
|---|---|
| *B60T 7/22* | (2006.01) |
| *B60W 30/08* | (2012.01) |
| *B60W 10/06* | (2006.01) |
| *B60W 10/18* | (2012.01) |
| *B60W 10/20* | (2006.01) |
| *B60W 50/14* | (2012.01) |

(52) U.S. Cl.
CPC ............ *B60W 10/20* (2013.01); *B60W 30/08* (2013.01); *B60T 2201/022* (2013.01); *B60W 2050/143* (2013.01); *B60W 2540/10* (2013.01); *B60W 2540/103* (2013.01); *B60W 2540/18* (2013.01); *B60W 2540/22* (2013.01); *B60W 2550/10* (2013.01); *B60W 2710/182* (2013.01)

(58) Field of Classification Search
CPC ......... B60W 2540/18; B60W 2540/22; B60W 2550/10; B60W 2540/10
See application file for complete search history.

(56) References Cited

U.S. PATENT DOCUMENTS

| | | | |
|---|---|---|---|
| 2008/0201039 A1* | 8/2008 | Matsuoka | B60W 50/16 701/41 |
| 2009/0037055 A1 | 2/2009 | Danner et al. | |
| 2009/0326820 A1* | 12/2009 | Shimizu | B60T 7/22 701/301 |
| 2010/0102622 A1* | 4/2010 | Favaretto | B60K 6/48 303/152 |
| 2011/0264348 A1 | 10/2011 | Cetinkaya et al. | |
| 2011/0295479 A1* | 12/2011 | Nodera | F02D 11/105 701/70 |
| 2012/0296542 A1 | 11/2012 | Nitz et al. | |
| 2013/0211687 A1 | 8/2013 | Trost et al. | |
| 2013/0261951 A1* | 10/2013 | Sekiguchi | B60T 7/22 701/301 |
| 2013/0345900 A1 | 12/2013 | Usui | |
| 2014/0222289 A1* | 8/2014 | Fujishiro | B60T 7/22 701/41 |
| 2016/0052511 A1* | 2/2016 | Takeuchi | F02N 5/04 701/22 |

FOREIGN PATENT DOCUMENTS

| | | |
|---|---|---|
| DE | 10 2008 042962 A1 | 4/2010 |
| DE | 10 2008 056204 A1 | 5/2010 |
| DE | 10 2010 007252 A1 | 8/2011 |
| DE | 10 2010 049351 A1 | 4/2012 |
| JP | 11-203598 A | 7/1999 |
| JP | 11-255089 A | 9/1999 |
| JP | 2000-326757 A | 11/2000 |
| JP | 2006-321485 A | 11/2006 |
| JP | 2008-1304 A | 1/2008 |
| JP | 2008-279863 A | 11/2008 |
| JP | 2012-196997 A | 10/2012 |
| JP | 2012-224119 A | 11/2012 |
| WO | 2012/114433 A1 | 8/2012 |
| WO | WO 2012/147166 A1 | 11/2012 |

* cited by examiner

VEHICLE CONTROL METHOD AND VEHICLE CONTROL SYSTEM

BACKGROUND OF THE INVENTION

1. Field of the Invention

The invention relates to a vehicle control method and a vehicle control system.

2. Description of Related Art

A brake control system for a vehicle is known which automatically puts a brake on the vehicle, depending on a risk of collision between the vehicle and an obstacle. The vehicular brake control system includes a collision determining means for determining whether the risk of collision between the vehicle and the obstacle is high, automatic braking means for automatically generating braking force by controlling a brake system of the vehicle, when the collision determining means determines that the risk of collision between the vehicle and the obstacle is high, and an automatic braking cancelling means for stopping automatic generation of the braking force by the automatic braking means, when the frequency at which the accelerator pedal of the vehicle is operated by the driver of the vehicle is equal to or higher than a predetermined value (see, for example, Japanese Patent Application Publication No. 2012-224119 (JP 2012-224119 A)).

However, in the vehicular brake control system as described in JP 2012-224119 A, only the frequency of operation of the accelerator pedal of the vehicle by the driver, or the duration of the operation, is taken into consideration, and automatic braking may not be cancelled in such a manner that better suits the intention of the driver.

SUMMARY OF THE INVENTION

The invention provides a vehicle control method and a vehicle control system, with which automatic braking, or the like, is cancelled in such a manner that better suits the intention of the driver.

A vehicle control method of performing automatic braking for automatically braking a vehicle or alarm output, depending on a possibility of a collision between the vehicle and an obstacle, according to a first aspect of the invention, includes: cancelling the automatic braking or the alarm output, when an accelerator operation amount is equal to or larger than a predetermined threshold value, during the automatic braking or the alarm output, and cancelling the automatic braking or the alarm output, when a given cancellation condition is satisfied under a situation where the accelerator operation amount of the vehicle is smaller than the predetermined threshold value, during the automatic braking or the alarm output.

A vehicle control system according to a second aspect of the invention includes a sensor that detects a condition of an obstacle around a vehicle, an accelerator pedal position sensor that detects an operation amount of an accelerator pedal, and an ECU that outputs a signal that requests automatic braking for automatically braking the vehicle or generation of an alarm, based on the condition of the obstacle, and stops output of the signal when the operation amount of the accelerator pedal is equal to or larger than a first threshold value, or when the operation amount of the accelerator pedal is smaller than the first threshold value, and a given first condition is satisfied.

According to the above aspects of the invention, it is possible to cancel automatic braking, or the like, in such a manner that better suits the intention of the driver.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described in detail with reference to the accompanying drawings.

Figure 1:
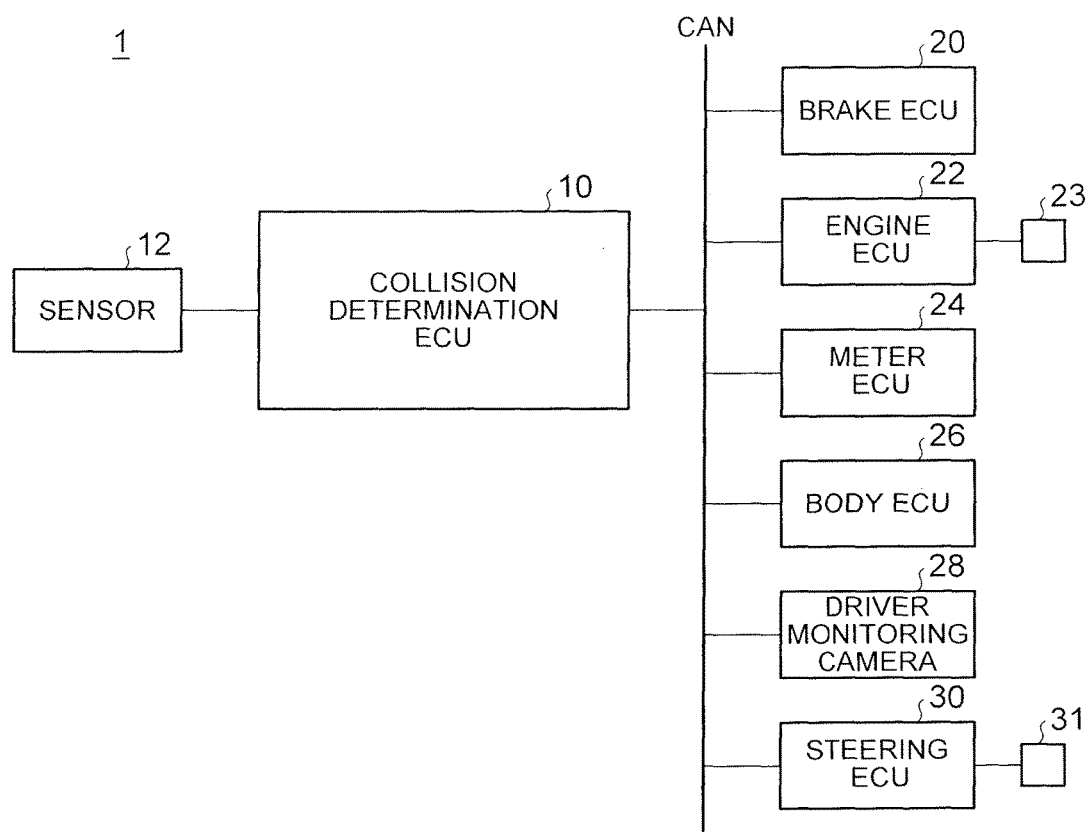
FIG. 1 is a view schematically showing the configuration of a vehicle control system according to one embodiment of the invention.

FIG. 1 schematically shows the configuration of a vehicle control system 1 according to one embodiment of the invention. The vehicle control system 1 includes a collision determination ECU (Electronic Control Unit) 10. Like other ECUs, the collision determination ECU 10 mainly consists of a microcomputer, or the like.

A sensor 12 is connected to the collision determination ECU 10. The sensor 12 detects conditions of an obstacle (typically, a vehicle) in front of the vehicle, using radio waves (e.g., millimeter waves), light waves (e.g., laser), or ultrasonic waves, as detection waves. The sensor 12 detects information indicating the relationship between the obstacle and the vehicle at predetermined intervals. The information indicating the relationship between the obstacle and the vehicle includes, for example, the velocity of the obstacle relative to the vehicle on which the sensor 12 is installed, the distance between the obstacle and the vehicle, and the direction (lateral position) of the obstacle as viewed from the vehicle. The sensor 12 may be a millimeter-wave radar. For example, the millimeter-wave radar may be an electronic scan type millimeter-wave radar. The electronic scan type millimeter-wave radar detects the relative velocity of the obstacle, using the Doppler frequency (frequency shift) of radio waves, detects the distance relative to the obstacle, using the delay time of reflected waves, and detects the direction of the obstacle based on a phase difference of received waves between two or more receiving antennas. The detection data is transmitted from the sensor 12 to the collision determination ECU 10 at predetermined intervals. One or more of the functions (e.g., the function of calculating the position of a forward obstacle) of the sensor 12 may be implemented by the collision determination ECU 10.

An image sensor may be used as the sensor 12. The image sensor includes a camera including an image pickup device, such as CCD (charge-coupled device) or CMOS (complementary metal oxide semiconductor), and an image processor, and is operable to recognize an image representing conditions of an obstacle. The camera of the image sensor may be a stereo camera. The image sensor detects conditions of the obstacle, based on the result of image recognition. More specifically, the image sensor detects information indicating the relationship between the obstacle and the vehicle, for example, the velocity of the obstacle relative to the vehicle, and the information on the position of the obstacle with reference to the vehicle, at predetermined intervals. The positional information of the obstacle may include information concerning the position (distance) of the obstacle in the longitudinal direction of the vehicle, and information concerning the lateral position (or overlap percentage) of the obstacle in the lateral direction (width direction). The lateral position of the obstacle may be calculated based on the center of a group of pixels associated with the obstacle as viewed in the lateral direction, or may be calculated as a range between the lateral position of the left end of the obstacle and the lateral position of the right end thereof. The information (detection result) obtained by the image sensor may be transmitted to the collision determination ECU 10 with a given frame period, for example. The image processing function (e.g., the function of calculating the position of a forward obstacle) of the image processor of the sensor 12 may be implemented by the collision determination ECU 10. The sensor 12 may include two or more types of the sensors as described above.

Various types of electronic components in the vehicle are connected to the collision determination ECU 10, via an appropriate bus, such as CAN (controller area network). In the embodiment shown in FIG. 1, a brake ECU 20 that controls a brake system (not shown), engine ECU 22 that controls an engine (not shown), meter ECU 24, body ECU 26, driver monitoring camera 28, and a steering ECU 30 are connected to the collision determination ECU 10.

The driver monitoring camera 28 includes a color or infrared-sensitive CCD (charge-coupled device) sensor array, for example, and is located at a position (e.g., on a steering column) where an image of the driver's face can be captured. The driver monitoring camera 28 has an image processing function, and detects various conditions (e.g., the direction of the driver' face, such as the driver's failure to keep his/her eyes on the road, a condition of slumber, and a condition of wakefulness). Any desired logic may be employed for detecting the face direction, and pattern matching, or the like, may be used. Similarly, any desired logic may be employed for detecting a condition of slumber or wakefulness, and the opening of the eyes, the frequency of yawns, etc. may be taken into consideration. The driver monitoring camera 28 may cooperate with another biological sensor (such as a body surface temperature sensor) to detect the condition of slumber or wakefulness. The image processing function (e.g., the function of detecting the driver's failure to keep his/her eyes on the road, or the condition of slumber) of the driver monitoring camera 28 may be implemented by the collision determination ECU 10.

An accelerator pedal position sensor 23 that detects the amount of operation of the accelerator pedal is connected to the engine ECU 22. The collision determination ECU 10 obtains information concerning the accelerator pedal position (the amount of operation of the accelerator pedal), via the engine ECU 22, or the like. However, the method by which the collision determination ECU 10 obtains information concerning the amount of operation of the accelerator pedal is not limited to this method. For example, the accelerator pedal position sensor 23 may be connected to the collision determination ECU 10, and the collision determination ECU 10 may obtain the information concerning the amount of operation of the accelerator pedal, directly from the accelerator pedal position sensor 23.

A steering angle sensor 31 that detects the steering angle of the steering wheel is connected to the steering ECU 30. The collision determination ECU 10 obtains information concerning the steering angle (namely, information from the steering angle sensor 31), via the steering ECU 30. However, the method by which the collision determination ECU 10 obtains information concerning the steering angle is not limited to this method. For example, the steering angle sensor 31 may be connected to the collision determination ECU 10, and the collision determination ECU 10 may obtain the information concerning the steering angle, directly from the steering angle sensor 31.

Figure 2:
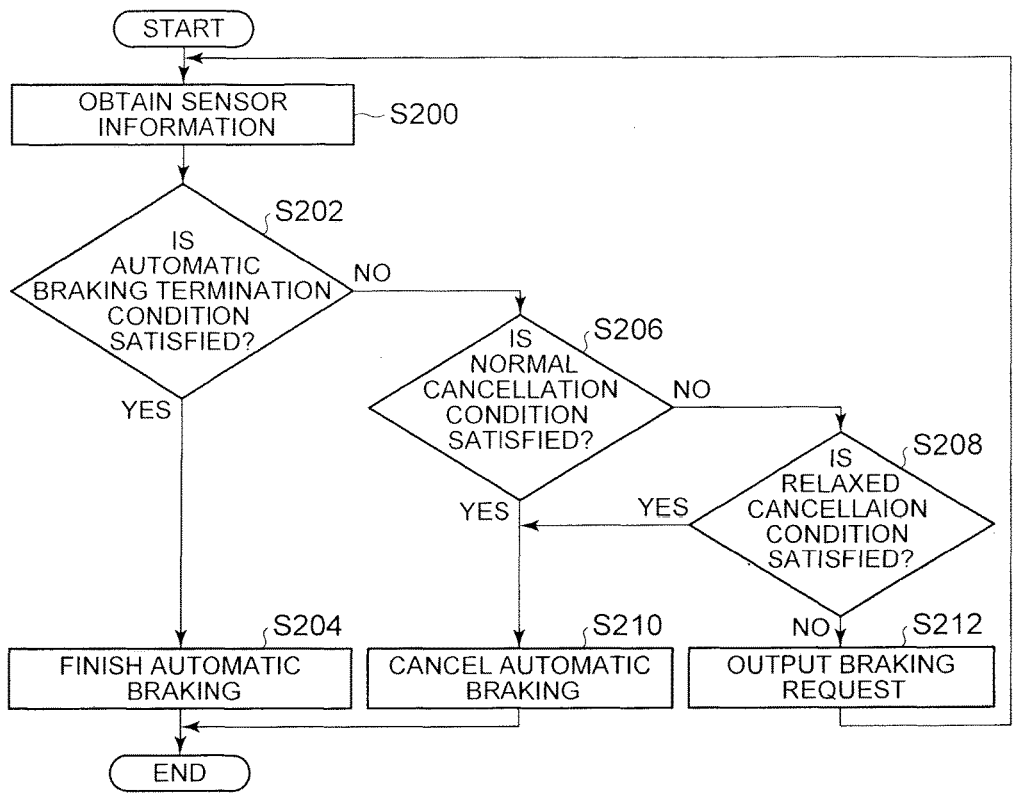
FIG. 2 is a view showing one example of processing implemented by a collision determination ECU of the vehicle control system of FIG. 1.

FIG. 2 illustrates one example of processing implemented by the collision determination ECU 10. The processing illustrated in FIG. 2 may be repeatedly executed at predetermined intervals, during execution of automatic braking, for example. The automatic braking may be started when an automatic braking condition is satisfied. The automatic braking condition, which is a condition that is satisfied when automatic braking should be carried out, may be set in any manner. For example, in collision avoidance control for avoiding collision with a forward obstacle, a length of time it takes for the vehicle to collide with the forward obstacle, or TTC (Time to Collision), may be calculated, and the automatic braking condition may satisfied when the calculated TTC becomes shorter than a predetermined value (e.g., 1.5 sec.). In this case, the collision determination ECU 10 may calculate the TIC for the forward obstacle located within a predetermined angular range (or lateral position), based on the result of detection from the sensor 12, and may determine that the automatic braking condition is satisfied when the calculated TTC becomes shorter than the predetermined value (e.g., 1.5 sec.). The TTC may be obtained by dividing the distance relative to the forward obstacle, by the relative velocity against the forward obstacle. In automatic driving control, an automatic braking condition may be satisfied when the magnitude of the deceleration required to keep the distance between a forward vehicle and the vehicle equal to a lower limit value exceeds a predetermined value, for example.

Also, the automatic braking condition may be satisfied when it is determined that collision with a forward obstacle (such as a vehicle) cannot be avoided. Namely, the condition may be satisfied when the possibility of collision with the forward obstacle is equal to or higher than a predetermined level (in this case, 100%). A great variety of methods for determining whether collision with a forward obstacle cannot be avoided are widely known in the field of pre-crash safety, and any of these methods may be employed. For example, the relative velocity at which collision can be avoided may be calculated in advance, for each TTC, and a collision unavoidableness determination map may be prepared based on the calculated relative velocities. In this case, the collision determination ECU 10 may determine whether collision with a forward obstacle cannot be avoided, referring to the collision unavoidableness determination map, based on the relative velocity against the forward obstacle, and the TTC. More specifically, the deceleration G (m/s$^2$) and deceleration velocity V (m/s) measured t seconds after automatic braking is started have the following relationships where $G_{MAX}$ (m/s$^2$) is the maximum velocity, and J (m/s$^3$) is the deceleration gradient: $G=Jt$, $V=J\times t^2/2$ when $t \leq G_{MAX}/J$, $G=G_{MAX}$, $V=G_{MAX}^2/(2J)+G_{MAX}(t-G_{MAX}/J)$ when $G_{MAX}/J<t$. In this case, the collision unavoidableness determination map may be created, by regarding the relative velocity larger than the deceleration velocity V measured t seconds after start of automatic braking, as a relative velocity at which collision cannot be avoided. In another method, the relative distance may be obtained by integrating the deceleration velocity V, and a collision unavoidableness determination map may be created, using the relative distance as a parameter. In a further method, the acceleration, etc. of the forward obstacle may be taken into consideration, for use in a further complicated algorithm.

In step S200, the latest information is obtained from various sensors. For example, information from the sensor 12, information concerning the accelerator pedal position (the amount of operation of the accelerator pedal), information from the steering angle sensor 31, and others, may be obtained. The obtained sensor information, which is needed in determining operations as will be described later, varies depending on a determination method employed (a relaxed cancellation condition employed).

In step S202, it is determined whether an automatic braking termination condition is satisfied. The automatic braking terminal condition is a condition for normally finishing automatic braking. The automatic braking termination condition may be any condition, but may be satisfied in the case where a collision is detected, the case where the vehicle body speed becomes equal to 0 km/h, the case where TTC exceeds 1.5 sec., or the case where an automatic braking request (step S212) has been generated for a predetermined period of time (e.g., 3 sec.) or longer. If the automatic braking termination condition is satisfied, the control proceeds to step S204. If not, the control proceeds to step S206.

In step S204, automatic braking is finished. To finish automatic braking, the collision determination ECU 10 may stop generating the automatic braking request (step S212) that had been generated until the last computation cycle. At this time, the automatic braking request may not be immediately stopped, but the automatic braking request may be continuously generated in such a manner that a target control value is reduced at a given rate to a given value close to 0, and then kept at the given value close to 0, so as to prevent rapid change of braking force. The given rate at which the target control value is reduced at this time may be larger a given rate (step S210) used when automatic braking is cancelled. The given value close to 0 may correspond to the minimum braking force required to keep the vehicle in a stopped state. In this manner, if the operation to finish automatic braking is completed in step S204 (namely, if the automatic braking request is stopped, or the target control value becomes equal to 0), the processing concerning this time's automatic braking ends.

In step S206, it is determined whether a normal cancellation condition is satisfied, based on information concerning the accelerator operation amount. The normal cancellation condition is satisfied when the accelerator operation amount is equal to or larger than a predetermined first threshold value Th1. The predetermined first threshold value Th1 corresponds to the lower limit of the range of accelerator operation amount within which the driver has a clear intention of accelerating the vehicle, and may be set by experiment, or the like. For example, the predetermined first threshold value Th1 may be a value around 60%. If the accelerator operation amount is equal to or larger than the predetermined first threshold value Th1, the control proceeds to step S210. If not, the control proceeds to step S208.

In step S208, it is determined whether a relaxed cancellation condition is satisfied, based on specified information. The relaxed cancellation condition is a condition different from the normal cancellation condition determined in the above step S206, and can be satisfied even when the accelerator operation amount is smaller than the predetermined first threshold value Th1. The relaxed cancellation condition may be satisfied when a specified collision avoidance operation of the driver is detected, under a situation where the accelerator operation amount is smaller than the predetermined first threshold value Th1. The driver's operation, which is performed so as to avoid collision with a forward obstacle, may be arbitrarily set or defined. The specified collision avoidance operation of the driver is typically realized by one or a combination of an operation performed on the accelerator pedal for acceleration, and a steering operation for changing the travelling direction. Some specific examples of collision avoidance operations (relaxed cancellation conditions) will be described later. If the relaxed cancellation condition is satisfied, the control proceeds to step S210. If not, the control proceeds to step S212.

In step S210, automatic braking is cancelled. Namely, if the normal cancellation condition or relaxed cancellation condition is satisfied after the automatic braking condition is satisfied, automatic braking is cancelled. If the normal cancellation condition or relaxed cancellation condition is satisfied, in the control cycle in which the automatic braking condition is satisfied for the first time, automatic braking may not be started, or automatic braking may be once started. In the latter case, automatic braking may be started while it is not determined whether the normal cancellation condition or relaxed cancellation condition is satisfied, in the control cycle in which the automatic braking condition is satisfied for the first time, and then, the control routine of FIG. 2 may be started. The automatic braking may be cancelled by stopping the automatic braking request (step S212) that had been generated until the last cycle. At this time, the automatic braking request may not be immediately stopped, but the automatic braking request may be continuously generated in such a manner that the target control value is reduced at a given rate to 0, so as to prevent rapid change of the braking force. Thus, if cancellation of automatic braking is completed in step S210 (namely, if the automatic braking request is stopped, or the target control value becomes equal to 0), the processing concerning this time's automatic braking ends.

In step S212, the automatic braking request is generated to the brake ECU 20, so as to execute automatic braking. The automatic braking is control for increasing the wheel cylinder pressure of each wheel, under a situation where the brake pedal is not operated by the driver. Accordingly, the target control value used at the time of automatic braking is determined based on a factor or factors other than the operation amount of the brake pedal. The target control value may be a fixed value, or a variable value. Even in the case where the target control value is a fixed value, the fixed value may change with time (see FIG. 3). Also, the target control value may be varied according to the vehicle speed obtained when automatic braking is started. The target control value may be any physical quantity, which may be, for example, a deceleration, hydraulic pressure, the rate of increase in the pressure, or the like. The target control value may be included in the automatic braking request and supplied to the brake ECU 20, or may be supplied as an automatic braking request to the brake ECU 20.

According to the processing illustrated in FIG. 2, the normal cancellation condition that is satisfied when the accelerator operation amount is equal to or larger than the predetermined first threshold value Th1 is used; therefore, automatic braking can be cancelled with high reliability, under the situation where the driver has a clear intention of accelerating the vehicle.

In this connection, even under the situation where the accelerator operation amount is smaller than the predetermined first threshold value Th1, it may be preferable to cancel automatic braking, depending on the reliability of collision determination (the reliability with which the automatic braking condition is determined), the degree of easiness to avoid collision (for example, it is relatively easy to avoid collision when the overlap percentage of a forward obstacle and the vehicle is low), and the driver's operation to avoid collision. Accordingly, if the collision determination ECU 10 is configured to uniformly apply only the normal cancellation condition to cancellation of automatic braking, automatic braking may be undesirably continued even under a situation where automatic braking should be cancelled early, and may fail to fit with the driver's feeling.

In this respect, according to the processing illustrated in FIG. 2, even in the situation where the accelerator operation amount is smaller than the predetermined first threshold value Th1 (namely, where the normal cancellation condition cannot be satisfied), automatic braking can be cancelled when the relaxed cancellation condition is satisfied. In this manner, automatic braking is prevented from being continued, under the situation where automatic braking should be cancelled early, thus making it possible to achieve control that fits with the driver's feeling.

In the processing illustrated in FIG. 2, after automatic braking is started, it is always determined whether the normal cancellation condition and relaxed cancellation condition are satisfied, unless the automatic braking termination condition is satisfied. However, the period of determination of the normal cancellation condition and relaxed cancellation condition may be more restricted. For example, the normal cancellation condition and relaxed cancellation condition may be determined when the above-indicated TTC is within a predetermined range, for example. The predetermined range corresponds to a period within which a collision avoidance operation is effective, and may be set by experiment, or the like. For example, the predetermined range may be in the range of 1.5 sec. to 0.4 sec. Also, the period of determination of the relaxed cancellation condition may not be the same as the period of determination of the normal cancellation condition, but the period of determination of the relaxed cancellation condition may be shorter than the period of determination of the normal cancellation condition, for example. In this case, the period of determination of the relaxed cancellation condition may be fully included in the period of determination of the normal cancellation condition, or a part of the determination period of the relaxed cancellation condition may not be included in the determination period of the normal cancellation condition.

While the automatic braking termination condition is determined earlier than the normal cancellation condition and the relaxed cancellation condition, the order of determination may be set as desired. For example, the normal cancellation condition and relaxed cancellation condition may be determined earlier, and then, the automatic braking termination condition may be determined. Similarly, the order of determination of the normal cancellation condition and that of the relaxed cancellation condition may also be set as desired.

Figure 3:
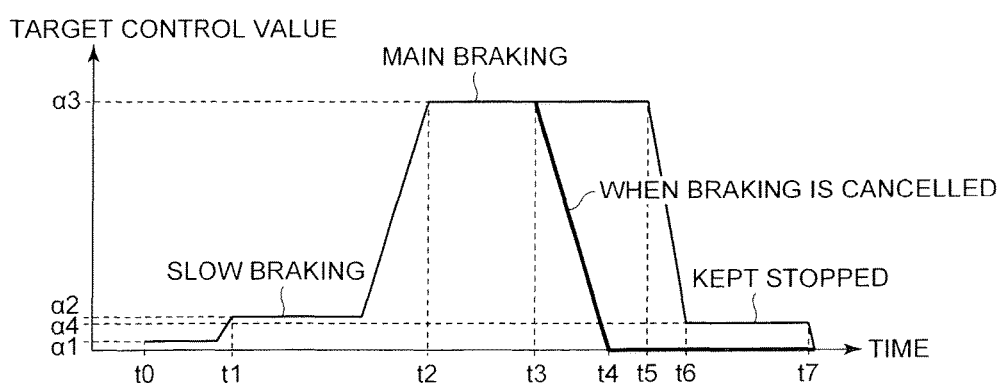
FIG. 3 is a view showing one example of patterns of changes in a target control value of an automatic braking request when automatic braking is cancelled and when automatic braking is normally finished.

FIG. 3 shows one example of patterns of changes in the target control value of the automatic braking request at the time when automatic braking is cancelled and when automatic braking is normally finished. In FIG. 3, the pattern of change or waveform of the target control value at the time when automatic braking is cancelled is indicated by the thick solid line.

Initially, the case where automatic braking is finished (namely, the case where automatic braking is normally finished) with neither of the normal cancellation condition and the relaxed cancellation condition being satisfied will be described. In the example shown in FIG. 3, the automatic braking condition is satisfied at time t0, and the condition where the automatic braking condition is satisfied continues until time t5; then, the automatic braking termination condition (see step S202 of FIG. 2) is satisfied at time t5. In this case, at time t0, the target control value of the automatic braking request is set to a predetermined value $\alpha1$ that is slightly larger than 0. The predetermined value $\alpha1$ may correspond to a value required to reduce or eliminate a backlash of a brake actuator (by releasing air, for example). Then, at time t1 that comes a given time after time t0, the target control value of the automatic braking request is set to a predetermined value $\alpha2$. The predetermined value $\alpha2$ is set to such a value that produces light, gentle braking force. Namely, automatic braking may be performed such that the maximum braking force (predetermined value $\alpha3$) is produced from the beginning; however, as shown in FIG. 3, light, gentle braking force may be produced at first, and then, the maximum braking force may be produced. Namely, the automatic braking may include moderate braking (preliminary braking) executed prior to main braking. Then, at time t2 that comes a given time after time t0, the target control value of the automatic braking request is set to a predetermined value $\alpha3$. The predetermined value $\alpha3$ may correspond to the maximum braking force that makes it possible to avoid collision with a forward obstacle (or minimize damage caused by collision). The predetermined value $\alpha3$ is maintained until time t5. If the automatic braking termination condition is satisfied at time t5, the target control value of the automatic braking request is reduced at a given rate from the predetermined value $\alpha3$ to a predetermined value $\alpha4$, and the predetermined value $\alpha4$ is maintained only for a given period of time (e.g., 2 sec.) from time t6. Then, the target control value is reduced down to 0 at time t7.

Next, the case where the normal cancellation condition or relaxed cancellation condition is satisfied during execution of automatic braking, and the automatic braking is cancelled, will be explained. In the example shown in FIG. 3, the automatic braking condition is satisfied at time t0, and then, the condition where the automatic braking condition is satisfied continues until time t3. Then, at time t3, the normal cancellation condition or relaxed cancellation condition (see steps S206, S208 of FIG. 2) is satisfied. In this case, the target control value varies in the same manner as described above until time t3. If the normal cancellation condition or relaxed cancellation condition is satisfied at time t3, the target control value of the automatic braking request is reduced at a given rate from the predetermined value $\alpha3$ to 0. The given rate may be lower than the given rate used when the automatic braking termination condition is satisfied, as shown in FIG. 3.

Next, some examples of relaxed cancellation conditions will be described. Each of the relaxed cancellation conditions of various types as described below may be used alone, or any combination of two or more relaxed cancellation conditions may be used. In this case, the relaxed cancellation conditions of various types are combined under an OR condition, but may be combined under an AND condition when appropriate.

A relaxed cancellation condition according to one example (first example) is satisfied when the accelerator operation amount is equal to or larger than a predetermined second threshold value Th2 (<predetermined first threshold value Th1), and the speed of depression of the accelerator pedal (the rate of increase of the accelerator operation amount) is equal to or higher than a predetermined speed. This is because, in this case, it can be determined with high accuracy that the driver has an intention of accelerating the vehicle, even though the accelerator operation amount does not reach the predetermined first threshold value Th1 (threshold value associated with the normal cancellation condition). The predetermined speed may correspond to the lower limit of the range within which the accelerator pedal depression speed can fall when the driver has an intention of accelerating the vehicle, and may be set by experiment, or the like. The predetermined speed may be a value within the range of 200 to 400 mm/sec., for example. If this relaxed cancellation condition is used in step S208 of FIG. 2, the information concerning the accelerator operation amount may be obtained as sensor information in step S200.

A relaxed cancellation condition according to another example (second example) is satisfied when the direction of the driver's face changed from a condition where the driver fails to keep his/her eyes on the road, to the front direction, and the accelerator operation amount increased by a predetermined amount or more after (in particular, immediately after) the change of the driver's face direction. This is because, in this case, it can be determined that the driver noticed a danger, and promptly depressed the accelerator pedal by an increased amount or depressed the accelerator pedal again (i.e., performed a collision avoidance operation). To depress the accelerator pedal by the increased amount means further depression of the accelerator pedal, and to depress the accelerator pedal again means depression of the accelerator pedal after the accelerator pedal is once released; both of the manners of depressing the accelerator pedal indicate that the driver's intention is finally the intention of accelerating the vehicle, and that the accelerator operation amount is increased. The predetermined amount by which the accelerator operation amount increased may be 20%, for example. If this relaxed cancellation condition is used in step S208 of FIG. 2, the information concerning the accelerator operation amount, and the information from the driver monitoring camera 28, may be obtained as sensor information in step S200.

A relaxed cancellation condition according to another example (third example) is satisfied when the direction of the driver's face changed from a condition where the driver fails to keep his/her eyes on the road, to the front direction, and a specified steering operation was performed after (in particular, immediately after) the change of the driver's face direction. This is because, in this case, it can be determined that the driver noticed a danger, and promptly performed the steering operation (i.e., performed a collision avoidance operation). The specified steering operation may be an operation that results in a change of the steering angle by a predetermined degree or larger. The predetermined degree of turn of the steering wheel may correspond to the lower limit of the range of steering angle within which the vehicle can move in the lateral direction by a distance corresponding to the width of one vehicle (or the width of one lane or the width of an overlap range between the forward obstacle and the vehicle), within a short time (for example, time corresponding to the current TTC, or a given fixed time). The predetermined degree may be set by experiment, or the like. Also, the specified steering operation may be a steering operation that results in an increase of the accelerator operation amount. Also, the specified steering operation may be determined in view of the steering torque or steering speed. Also, the specified steering operation may be determined in view of the steering direction, as in the case of a ninth example as will be described later. When this relaxed cancellation condition is used in step S208 of FIG. 2, the information concerning the accelerator operation amount, and the steering angle information, may be obtained in step S200.

A relaxed cancellation condition according to another example (fourth example) is satisfied when the driver's condition changed from a condition of slumber to a condition of wakefulness, and the accelerator operation amount increased by a predetermined amount or more after (in particular, immediately after) the change of the driver's condition. This is because, in this case, it can be determined that the driver noticed a danger, and promptly depressed the accelerator pedal by an increased amount or depressed the accelerator pedal again (i.e., performed a collision avoidance operation). The predetermined amount by which the accelerator operation amount increased may be 20%, for example. If this relaxed cancellation condition is used in step S208 of FIG. 2, the information concerning the accelerator operation amount, and the information from the driver monitoring camera 28, may be obtained as sensor information in step S200.

A relaxed cancellation condition according to another example (fifth example) is satisfied when the driver's condition changed from a condition of slumber to a condition of wakefulness, and a specified steering operation was performed after (in particular, immediately after) the change of the driver's condition. This is because, in this case, it can be determined that the driver noticed a danger, and promptly performed the steering operation (i.e., performed a collision avoidance operation). The specified steering operation may be an operation that results in a change of the steering angle by a predetermined degree or larger. The predetermined degree of turn of the steering wheel may correspond to the lower limit of the range of steering angle within which the vehicle can move in the lateral direction by a distance corresponding to the width of one vehicle (or the width of one lane or the width of an overlap range between the forward obstacle and the vehicle), within a short time. The predetermined degree may be set by experiment, or the like. Also, the specified steering operation may be a steering operation that results in an increase of the accelerator operation amount. Also, the specified steering operation may be determined in view of the steering torque or steering speed. Also, the specified steering operation may be determined in view of the steering direction, as in the case of the ninth example as described later. When this relaxed cancellation condition is used in step S208 of FIG. 2, the information concerning the accelerator operation amount, and the steering angle information, may be obtained in step S200.

A relaxed cancellation condition according to another example (sixth example) is satisfied when a specified steering operation is performed within a predetermined period of time (e.g., 2 sec.) after the automatic braking condition is satisfied, and the accelerator operation amount is equal to or larger than a predetermined third threshold value Th3 (<predetermined first threshold value Th1). This is because it can be determined that the driver performs a collision avoidance operation, based on the fact that the steering operation is performed within the predetermined time after the automatic braking condition is satisfied. The predetermined third threshold value Th3 may be significantly lower than the predetermined threshold value Th2, and may be 30%, for example. Similarly, the specified steering operation may be a steering operation that results in an increase of the accelerator operation amount. Also, the specified steering operation may be determined in view of the steering torque or the steering speed. Also, the specified steering operation may be determined in view of the steering direction, as in the case of the ninth example as will be described later.

A relaxed cancellation condition according to another example (seventh example) is satisfied when the reliability of the detection result of the sensor 12 is reduced, and a specified steering operation was performed. In this case, it may be preferable not to continue automatic braking; therefore, the relaxed cancellation condition is established so as to make it more likely to cancel automatic braking. For example, when a laser sensor is used as the sensor 12, reduction of the reliability of the detection result of the sensor 12 may be detected when a temporary reduction of reflection power of the laser sensor is detected. Generally, a temporary reduction of the reflection power of the laser sensor occurs when a detection beam of the reflection power changes from a main beam to a side beam as the distance between the forward obstacle and the vehicle decreases. While the detection beam of the reflection power changes from the main beam to the side beam when the distance between the forward obstacle and the vehicle becomes a very small distance (e.g., 3, 4 m), no temporary significant reduction in the reflection power of the laser sensor occurs when the detection result of the laser sensor has a high reliability. Accordingly, the temporary significant reduction in the reflection power of the laser sensor means low reliability of the detection result of the laser sensor. Similarly, the specified steering operation may be an operation that results in a change of the steering angle by a predetermined degree or larger. The predetermined degree of turn of the steering wheel may correspond to the lower limit of the range of steering angle within which the vehicle can move in the lateral direction by a distance corresponding to the width of one vehicle (or the width of one lane or the width of an overlap range between the forward obstacle and the vehicle), within a short time. The predetermined degree may be set by experiment, or the like. Also, the specified steering operation may be a steering operation that results in an increase of the accelerator operation amount. Also, the specified steering operation may be determined in view of the steering torque or steering speed. Also, the specified steering operation may be determined in view of the steering direction, as in the case of the ninth example as described later.

A relaxed cancellation condition according to another example (eighth example) is satisfied when the forward obstacle suddenly moved into the same lane as that in which the vehicle is present (cutting-in of the forward obstacle or cutting-in of the vehicle occurs), and a specified steering operation was performed after (in particular, immediately after) the cutting-in. This is because, in this case, it can be determined that the driver performs a collision avoidance operation in response to cutting-in of the forward obstacle or after intentional cutting-in of the vehicle. For example, the intentional cutting-in of the vehicle may take place when the vehicle cuts into pace between two vehicles running on a lane on the right-hand side of the vehicle in order to pass through the space between the two vehicles and enter into a right turn lane. Similarly, the specified steering operation may be an operation that results in a change of the steering angle by a predetermined degree or larger. The predetermined degree of turn of the steering wheel may correspond to the lower limit of the range of steering angle within which the vehicle can move in the lateral direction by a distance corresponding to the width of one vehicle (or the width of one lane or the width of an overlap range between the forward obstacle and the vehicle), within a short time. The predetermined degree may be set by experiment, or the like. Also, the specified steering operation may be a steering operation that results in an increase of the accelerator operation amount. Also, the specified steering operation may be determined in view of the steering torque or steering speed. Also, the specified steering operation may be determined in view of the steering direction, as in the case of the ninth example as described later. The steering direction may be the same direction as the steering direction at the time of cutting-in. When this relaxed cancellation condition is used in step S208 of FIG. 2, the information from the sensor 12, and the steering angle information, may be obtained as sensor information in step 200. The cutting-in of the forward obstacle or the cutting-in of the vehicle may be detected based on the vehicle lane probability (probability with which the forward obstacle exists in the same lane as the vehicle) calculated based on the information from the sensor 12. For example, the vehicle lane probability may be computed by accumulating the probability with which the forward obstacle exists in the same lane as the vehicle, at given time intervals, (for example, accumulating 5% at a maximum at given time intervals, up to 100% at a maximum as the upper limit of the accumulated value). This manner of calculation is based on the same way of thinking as that about a ballot box which will be described later. In this case, when the vehicle lane probability rises sharply, it may be determined that cutting-in of the forward obstacle or cutting-in of the vehicle occurred.

Figure 4A:
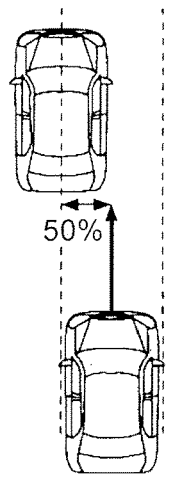
FIGS. 4A and 4B are schematic views useful for explaining the overlap percentage.
Figure 4B:
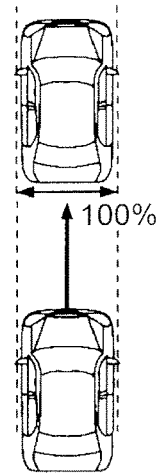

A relaxed cancellation condition according to another example (ninth example) is satisfied when the forward obstacle overlapped the vehicle such that the centerline of the forward obstacle deviated to the right or to the left in the lateral direction from that of the vehicle (namely, the overlap percentage is smaller than 100%, as shown in FIG. 4A), and a specified steering operation was performed in such a direction as to reduce the overlap range. This is because, in this case, a collision avoidance operation can be more easily performed as compared with the case where the lateral position of the forward obstacle coincides with that of the vehicle (namely, the overlap percentage is 100%, as shown in FIG. 4B), and it can be determined that the driver performs the collision avoidance operation. In the example as shown in FIG. 4A, this relaxed cancellation condition is satisfied when the specified steering operation to turn the vehicle to the right is performed. When this relaxed cancellation condition is used in step S208 of FIG. 2, the information from the sensor 12, and the steering angle information, may be obtained as sensor information in step S200. The overlap percentage (range) may be calculated based on the information from the sensor 12. Namely, the overlap percentage may be calculated based on the lateral position of the forward obstacle. At this time, a movement vector (see FIG. 5) of the forward obstacle may be taken into consideration. Similarly, the specified steering operation may be an operation that results in a change of the steering angle by a predetermined degree or larger. The predetermined degree of turn of the steering wheel may correspond to the lower limit of the range of steering angle within which the vehicle can move in the lateral direction by a distance corresponding to the width of one vehicle (or the width of one lane or the width of an overlap range between the forward obstacle and the vehicle), within a short time. The predetermined degree may be set by experiment, or the like. Also, the specified steering operation may be a steering operation that results in an increase of the accelerator operation amount. Also, the specified steering operation may be determined in view of the steering torque or steering speed. Also, space for evacuation (e.g., the presence or absence of a lane or a road shoulder) in a steering direction of the specified steering operation may be taken into consideration, based on map data of a navigation system, or information from a forward camera, for example.

A relaxed cancellation condition according to another example (tenth example) is satisfied when a region (lateral position of collision) of the vehicle expected to collide with a forward obstacle was located closer to one of the right and left sides of the vehicle as viewed in the lateral direction, and a specified steering operation to turn the vehicle to the side opposite to the above one side was performed. The relaxed cancellation condition according to the tenth example is substantially based on the same way of thinking as the relaxed cancellation condition according to the ninth example as described above.

Figure 5:
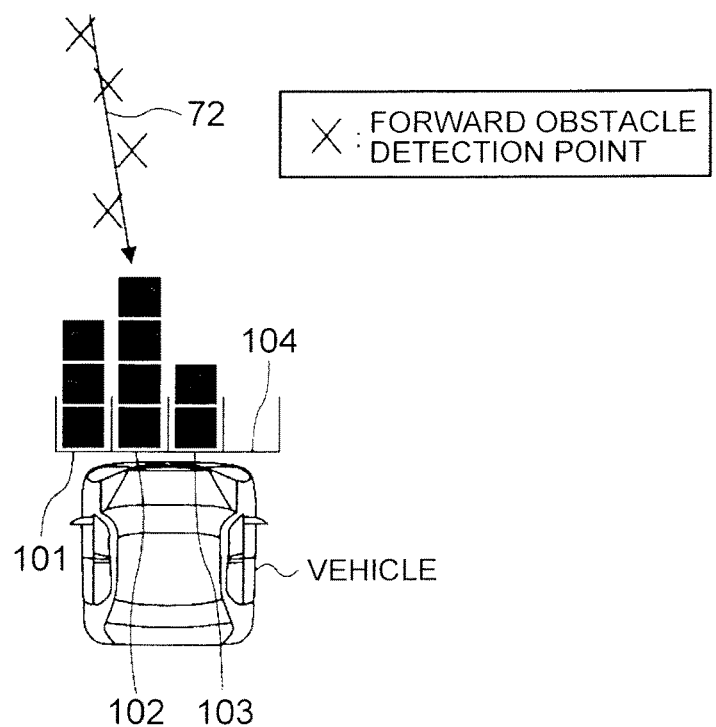
FIG. 5 is an explanatory view showing one example of method of determining a relaxed cancellation condition according to a tenth example.

FIG. 5 illustrates one example of method for determining the relaxed cancellation condition according to the tenth example. In FIG. 5, a movement vector 72 is depicted along with the vehicle. The movement vector 72 is that of the forward obstacle located in front of the vehicle, and may be derived from positional information (information from the sensor 12) of the forward obstacle obtained at a plurality of points in time.

In FIG. 5, four ballot boxes 101, 102, 103, 104 are schematically shown in the front of the vehicle. The ballot boxes 101, 102, 103, 104 corresponding to respective regions into which the front of the vehicle is divided in the lateral direction are virtually set. The number of ballot boxes (four in this embodiment) may be set to any number. The width of each region in the front of the vehicle (namely, the width of each region corresponding to each ballot box) may be equal, or may be set in a different manner depending on the region.

In the example as shown in FIG. 5, the collision probability is calculated for each region in the front of the vehicle. Here, the collision probability is calculated for each region in the front of the vehicle, in each given cycle (e.g., in each control cycle shown in FIG. 2), to be equal to 10% at a maximum. The collision probability calculated for each region in the front of the vehicle is cast into one of the ballot boxes 101, 102, 103, 104 corresponding to the region, in each given cycle, and an accumulated value of the collision probabilities obtained in a total of ten cycles (the latest ten cycles) is evaluated. Namely, the accumulated value of the collision probabilities obtained at respective points in time, i.e., the latest ten points in time, is evaluated. The collision probability at a certain point in time may be calculated based on the movement vector and the reliability. More specifically, which of the regions in the front of the vehicle to which the collision lateral position calculated based on the movement vector as described above belongs is determined, and a probability of 10% at a maximum is given to the ballot box associated with the region to which the collision lateral position belongs. At this time, the reliability may be taken into consideration in such a manner that the collision probability at that point in time is multiplied by the degree of reliability at that point in time (reliability concerning the calculated movement vector). For example, if the reliability at that point in time is equal to the maximum value (e.g., 100%), the maximum probability 10% (10%×1) may be given to the ballot box associated with the region to which the collision lateral position belongs. If, on the other hand, the reliability at that point in time is equal to the minimum value (e.g., 0%), a probability of 0% (10%×0) may be given to the ballot box associated with the region to which the collision lateral position belongs.

In the example as shown in FIG. 5, a condition where the collision probabilities calculated at four points in time are cast into each ballot box is schematically illustrated. Collision probabilities larger than 0(%) are cast at three points in time, into the ballot box 101, and collision probabilities larger than 0(%) are cast at four points in time, into the ballot box 102, while collision probabilities larger than 0(%) are cast at two points in time, into the ballot box 103, and no collision probability larger than 0(%) is cast into the ballot box 104. For example, if the collision probabilities of 10% are cast into the ballot box 102, at all of the latest four points in time (the collision probability is 0% at six points prior to the latest four points in time), the accumulated value of the collision probabilities of the ballot box 102 becomes equal to 40%. Accordingly, in this case where the region of the vehicle expected to collide with the forward obstacle is located closer to the left side of the vehicle, the relaxed cancellation condition according to the tenth example is satisfied when the specified steering operation to turn the vehicle to the right is performed. Similarly, the specified steering operation may be an operation that results in a change of the steering angle by a predetermined degree or larger. The predetermined degree of turn of the steering wheel may correspond to the lower limit of the range of steering angle within which the vehicle can move in the lateral direction by a distance corresponding to the width of one vehicle (or the width of one lane or the width of an overlap range between the forward obstacle and the vehicle), within a short time. The predetermined degree may be set by experiment, or the like. Also, the specified steering operation may be a steering operation that results in an increase of the accelerator operation amount. Also, the specified steering operation may be determined in view of the steering torque or steering speed. Also, space for evacuation (e.g., the presence or absence of a lane or a road shoulder) in a steering direction of the specified steering operation may be taken into consideration, based on map data of a navigation system, or information from a forward camera, for example.

While one embodiment of the invention has been described in detail, the invention is not limited to any particular embodiment, but may be embodied with various modifications or changes, within the range as defined by the appended claims. It is also possible to combine all of or two or more of constituent elements of the embodiment as described above.

For example, in the above-described embodiment, a part or all of the functions of the collision determination ECU 10 may be implemented by other ECU(s). For example, the processing illustrated in FIG. 2 may be executed by the brake ECU 20, or the collision determination ECU 10 may cooperate with the brake ECU 20 to execute the processing of FIG. 2.

While the above-described embodiment is concerned with cancellation of automatic braking, the invention may be applied to cancellation of alarm output. Namely, the invention may be applied to a vehicle control system configured to perform alarm output, in place of automatic braking. In this case, if an alarm generation condition similar to and corresponding to the automatic braking condition is satisfied, a signal requesting generation of an alarm is generated, and an alarm is given to the driver, based on this signal. Then, if a similar normal cancellation condition or relaxed cancellation condition is satisfied, the collision determination ECU 10 stops generating the signal requesting generation of an alarm. Also, if a similar alarm termination condition corresponding to the automatic braking termination condition is satisfied, output of the signal may be stopped. The way of thinking about the relaxed cancellation condition for stopping output of the signal requesting generation of an alarm may be similar to that about the relaxed cancellation condition for stopping output of the signal requesting execution of automatic braking.

In the above-described embodiment, an alarm may be generated in any manner, along with automatic braking. In this case, a relaxed cancellation condition may be satisfied when a specified steering operation, an increase in the depression amount of the accelerator pedal, or re-depression of the accelerator pedal, is detected within a given period of time after the alarm starts being generated.

While the sensor 12 of the above-described embodiment is designed to detect a forward obstacle located in front of the vehicle, the sensor of the invention may detect an obstacle, such as a rear obstacle or a side obstacle, other than the forward obstacle. For example, the sensor may be in the form of a rear radar sensor that detects a rear obstacle, or a side radar sensor that detects a side obstacle. Namely, the obstacle may be located in any direction.

While the above-described embodiment is concerned with cancellation of automatic braking control, the invention may be applied to cancellation of other control that may be executed so as to reduce damage at the time of collision. Other control may include control for rewinding a pre-crash seat belt (seat-belt pretensioner), control for moving the position of a bumper, or the like, and others.

In the above-described embodiment, the automatic braking control may include preliminary braking control executed prior to main automatic braking control. Namely, the automatic braking control may be performed in such a manner that light, gentle braking force is generated at first, and then, required braking force is generated. Also, the automatic braking control may be replaced with driving force suppression control for suppressing driving force by reducing the output of an engine or motor, or may be implemented in combination with the driving force suppression control.

In the above-described embodiment, in connection with various types of relaxed cancellation conditions, a shift-lever operation to change the shift range to a lower range (e.g., from the fifth speed to the third speed), or the like, may be additionally taken into consideration, from the same standpoint as the operation to increase the accelerator operation amount.

While the accelerator operation amount is determined by the amount of operation of the accelerator pedal in the above-described embodiment, it may be equivalently determined by the throttle opening.

The invention claimed is:

1. A vehicle control method of performing automatic braking for automatically braking a vehicle or alarm output, depending on a likelihood of a collision between the vehicle and an obstacle, wherein said automatic braking or said alarm output is cancelled when one of a first cancellation condition and a second cancellation condition is fulfilled during said automatic braking or said alarm output, the method comprising:

determining the likelihood of the collision between the vehicle and the obstacle;
starting said automatic braking in response to a determination that the likelihood of the collision is above a collision threshold value;
cancelling said automatic braking or the alarm output according to a first cancellation condition, wherein the first cancellation condition is fulfilled when an accelerator operation amount is equal to or larger than a predetermined threshold value, during the automatic braking or the alarm output; and
cancelling said automatic braking or the alarm output according to a second cancellation condition other than the first cancellation condition, wherein the second cancellation condition is fulfilled when a steering operation is detected under a situation where the accelerator operation amount of the vehicle is smaller than the predetermined threshold value, during the automatic braking or the alarm output while the likelihood of the collision between the vehicle and the obstacle is above the collision threshold value.

2. The vehicle control method according to claim 1, wherein
the second cancellation condition is fulfilled based on a combination of an accelerator operation that increases the accelerator operation amount and the steering operation.

3. The vehicle control method according to claim 1, wherein
the second cancellation condition is fulfilled under a situation where (i) an overlap range between the vehicle and the obstacle in a lateral direction is located closer to one of right and left sides of the vehicle, and (ii) the steering operation includes turning the vehicle in a direction that reduces the overlap range.

4. The vehicle control method according to claim 1, wherein
the second cancellation condition is fulfilled based on a combination of a condition of the driver's face determined based on an image recognition result of a face image of the driver and the steering operation.

5. The vehicle control method according to claim 4, wherein
the second cancellation condition is fulfilled when the steering operation is performed after the driver changes to face front from a condition where the driver fails to face front, or after the driver's condition changes from a condition of slumber into a condition of wakefulness.

6. The vehicle control method according to claim 1, wherein the steering operation includes an operation that results in a change in a steering angle by a predetermined degree or larger.

7. The vehicle control method according to claim 1, wherein the steering operation is determined based upon a steering torque or a steering speed.

8. The vehicle control method according to claim 1, wherein the automatic braking includes generation of braking force by controlling a brake system of the vehicle.

9. The vehicle control method according to claim 1, wherein the automatic braking includes increasing a wheel cylinder pressure of each wheel under a situation where a brake pedal is not operated.

10. The vehicle control method according to claim 1, wherein the automatic braking includes suppression of a driving force by reducing an output of an engine or a motor.

11. A vehicle control system comprising:
a sensor configured to detect a condition of an obstacle around a vehicle;
an accelerator pedal position sensor configured to detect an operation amount of an accelerator pedal; and
an electronic control unit (ECU) configured to:
determine a likelihood of a collision between the vehicle and the obstacle based on said condition,
output a signal that requests automatic braking for automatically braking the vehicle or generation of an alarm in response to a determination that the likelihood of the collision is above a collision threshold value,
stop output of the signal according to a first cancellation condition, wherein the first cancellation condition is fulfilled when the operation amount of the accelerator pedal is equal to or larger than a first threshold value, and
stop the output of the signal according to a second cancellation condition other than the first cancellation condition, wherein the second cancellation condition is fulfilled when a steering operation is detected under a situation where the accelerator operation amount of the vehicle is smaller than the first threshold value while the likelihood of the collision is above the collision threshold value.

* * * * *